United States Patent [19]

Flood et al.

[11] Patent Number: 4,494,938
[45] Date of Patent: Jan. 22, 1985

[54] MASTER BUOY SYSTEM FOR ACOUSTIC ARRAY DEPLOYMENT, USING UNDERWATER GLIDE BODIES REMOTELY LAUNCHED FROM A SUBMERGED POD

[75] Inventors: Robert A. Flood, San Diego; Howard R. Talkington, La Jolla; Richard A. Wheelock; Robert L. Watts, both of San Diego, all of Calif.

[73] Assignee: The United States of America as represented by the Secretary of the Navy, Washington, D.C.

[21] Appl. No.: 190,111

[22] Filed: Sep. 24, 1980

Related U.S. Application Data

[62] Division of Ser. No. 800,584, May 23, 1977, Pat. No. 4,272,835.

[51] Int. Cl.³ .............................................. B63B 21/52
[52] U.S. Cl. ...................................................... 441/33
[58] Field of Search .................... 441/32, 33; 114/244, 114/245; 367/4, 5, 6, 7, 153, 165, 173

[56] References Cited

U.S. PATENT DOCUMENTS

| | | | |
|---|---|---|---|
| 3,372,666 | 3/1968 | Baker | 114/245 |
| 3,541,989 | 11/1970 | Leonard | 114/245 |
| 3,946,695 | 3/1976 | Isaak | 114/293 |
| 3,978,811 | 9/1976 | Angus et al. | 114/245 |
| 4,193,057 | 3/1980 | Bennet et al. | 441/33 |
| 4,272,835 | 6/1981 | Flood et al. | 367/153 |

Primary Examiner—Trygve M. Blix
Assistant Examiner—Jesús D. Sotelo
Attorney, Agent, or Firm—Robert F. Beers; Ervin F. Johnston; Thomas G. Keough

[57] ABSTRACT

A method and apparatus deploys a hydrophone array in a predetermined pattern. A master buoy includes a float and an anchor which hold a central portion at a predetermined depth in the water. A number of hydrodynamically shaped glide vehicles are disengaged from the central portion and glide radially outwardly from it. When the glide vehicles come to rest, strings of hydrophones are released and buoyed along the bottom in a preestablished pattern. Acoustic energy impinging on the hydrophones, optionally is fed to a transmitting unit on the float or to a remote installation via a cable lying on the bottom.

6 Claims, 10 Drawing Figures

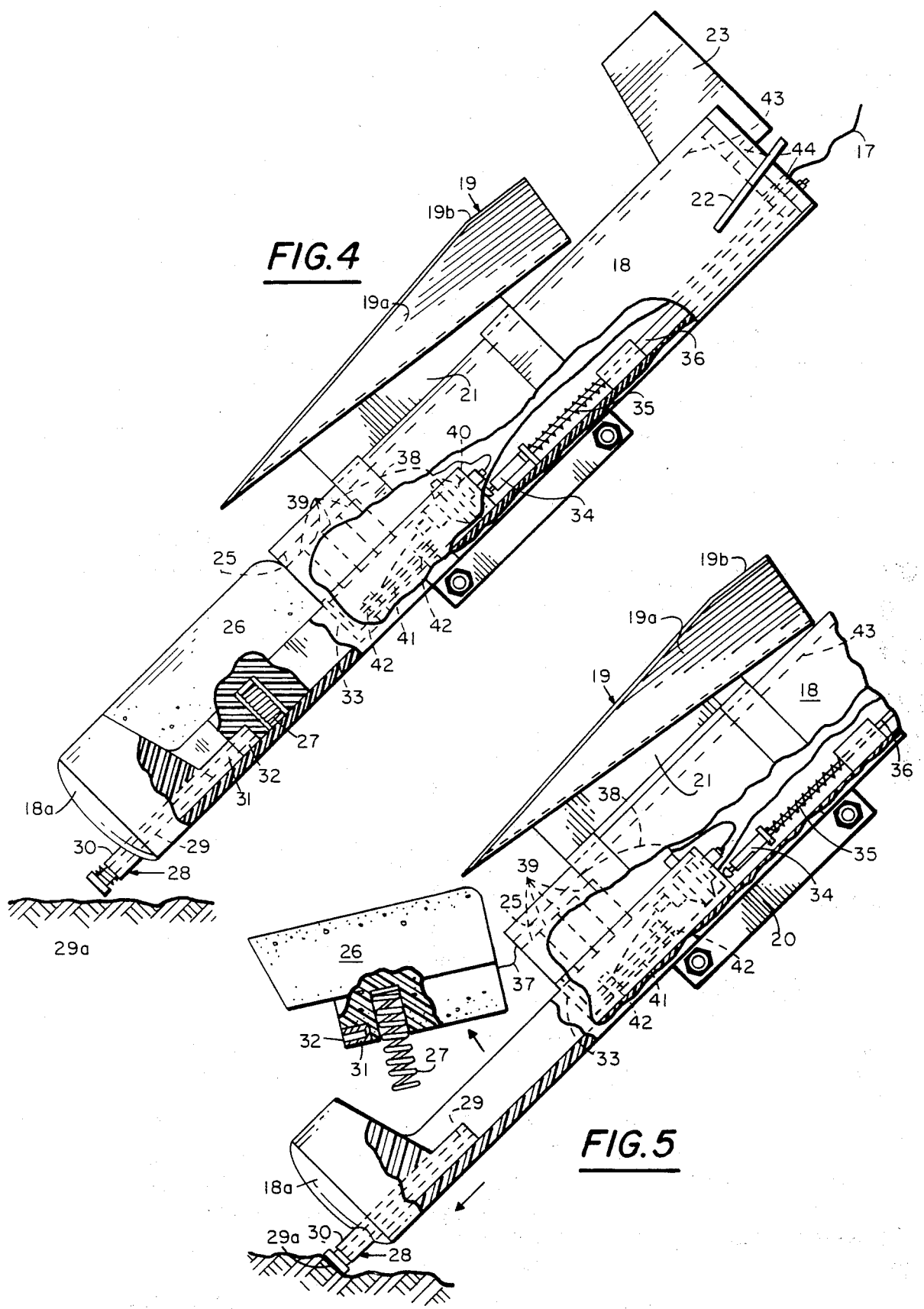

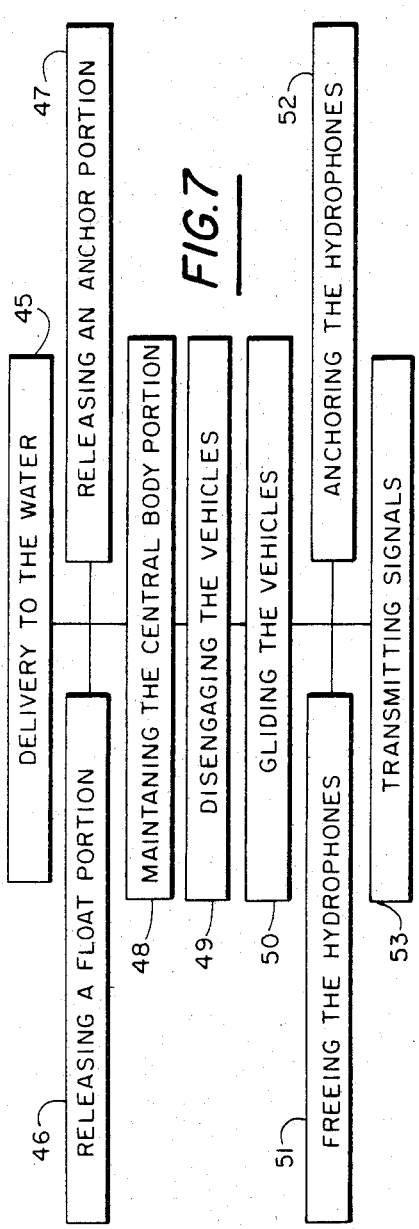
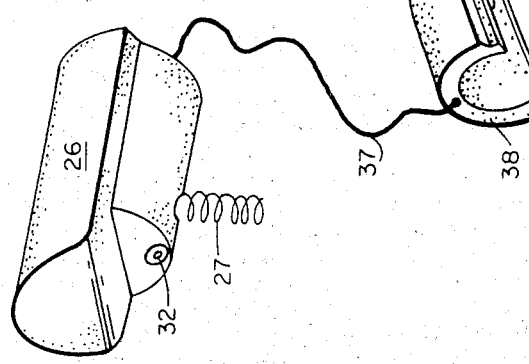
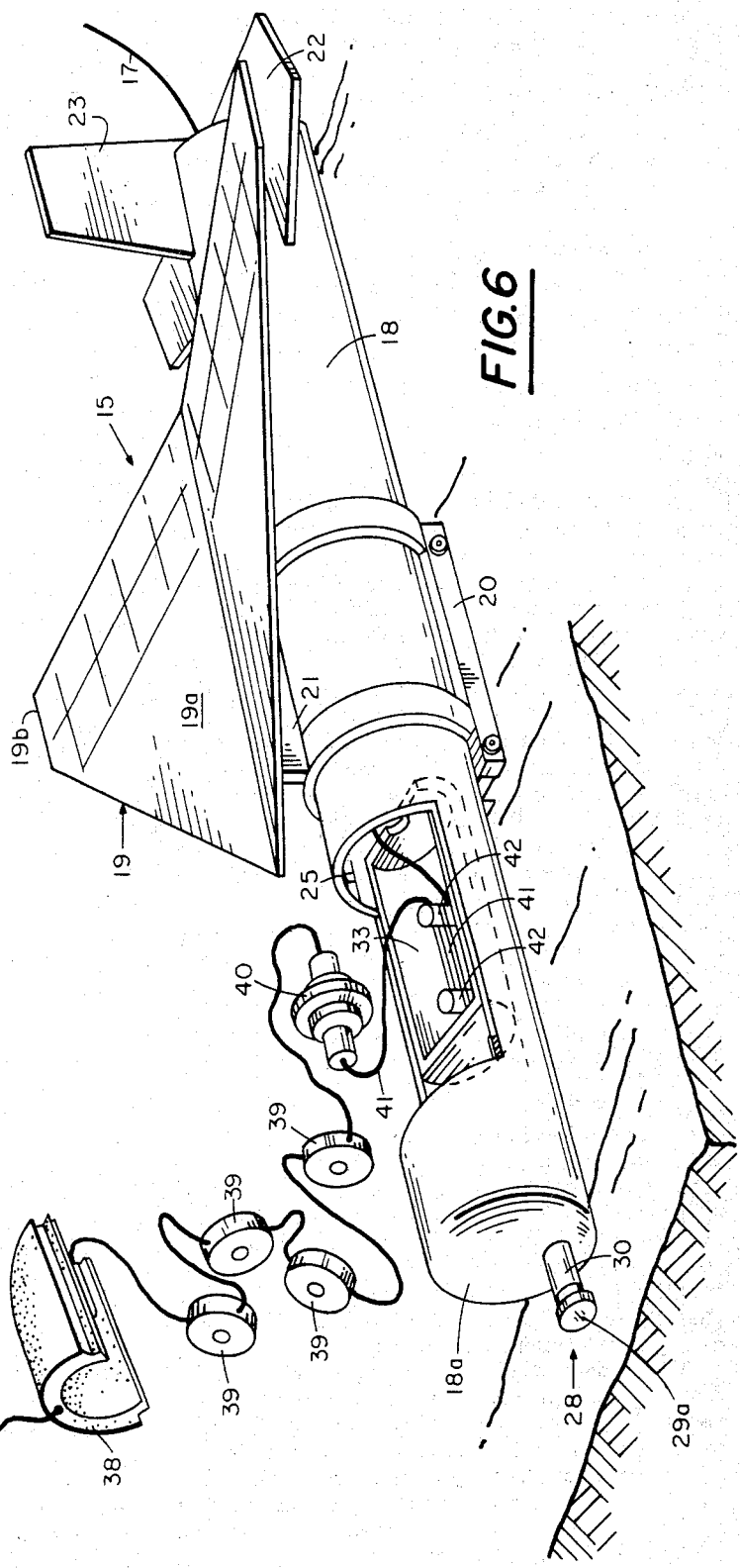

4,494,938

MASTER BUOY SYSTEM FOR ACOUSTIC ARRAY DEPLOYMENT, USING UNDERWATER GLIDE BODIES REMOTELY LAUNCHED FROM A SUBMERGED POD

STATEMENT OF GOVERNMENT INTEREST

The invention described herein may be manufactured and used by or for the Government of the United States of America for governmental purposes without the payment of any royalties thereon or therefor.

CROSS REFERENCE TO A RELATED APPLICATION

This is a divisional application of Ser. No. 800,584 filed on May 23, 1977, now U.S. Pat. No. 4,272,835.

BACKGROUND OF THE INVENTION

Unattended hydrophones have long been used to monitor marine traffic or seismic phenomena. Usually the hydrophone arrays were prearranged in a preestablished pattern so that meaningful readings of bearings and range, for example, can be obtained however, considerable effort and time were expended each time an array was so deployed and the separation of the hydrophone elements needed to be a sufficient measured distance to allow the gathering of more meaningful data.

Another drawback attendant most of the state-of-the-art deployment approaches was that emplacing that array too often could be watched by possibly unfriendly observers. From a military standpoint this is unacceptable, since it is a relatively simple matter to neutralize an unguarded array or so reposition it to gather nonrepresentative data. Although some arrays have been set by submersibles of some sort, the use of a submersible calls for elaborate planning, may not be cost effective and is unduly time consuming. Furthermore, the rather sinister veil associated with some submersibles makes it inadvisable to have them be discovered in some waters. Therefore, there is a continuing need in the state-of-the-art for a method and apparatus for deploying a hydrophone array in a preestablished pattern which is done quickly and covertly.

SUMMARY OF THE INVENTION

The present invention is directed to providing a method of deploying an array of hydrophones in a body of water. An anchor portion is released from a central body portion which carries a number of vehicles. Next the vehicles are disengaged from the central body portion and they glide radially outwardly from the central body portion. The hydrophones are freed from the radially disposed vehicles and form a hydrophone array having a predetermined spaced pattern.

The invention is also directed to an apparatus for deploying an array of hydrophones and includes a means disposed in a body of water for releasing an anchor portion from a central body portion. Several means carried on the body portion glide radially outwardly from the central body portion and frees the hydrophones in a predetermined spaced configuration.

The invention is further directed to a glide vehicle which is hydrodynamically shaped to descend and swoop outwardly until it strikes the bottom. Upon striking, floats and a biased mechanism deploy a string of hydrophones into the water and the body of the glide vehicle anchors the hydrophones.

A prime object of the invention is to provide a method and apparatus for deploying a hydrophone array.

Another object of the invention is to provide an array deployment scheme which is covert.

Still another object is to provide an array deployment scheme which is quick and cost effective.

Still another object is to provide a method and apparatus for array development which is expedient.

Yet another object is to provide a method and apparatus for deploying an array which does not require submersibles or divers for precise array placement.

A further object of the invention is to provide glide bodies hydrodynamically configured to assure a predetermined extension from a position of launch.

Yet another object is to provide a glide body carrying a number of hydrophones for remote deployment.

Still another object is to provide a glide vehicle releasing floats and an interconnected hydrophone array as it strikes the bottom.

Another object is to provide a glide vehicle for deploying a hydrophone array of high reliability.

Another object is to provide for assuring a controlled deployment of a hydrophone array.

These and other objects of the invention will become more readily apparent from the ensuing specification when taken with the drawings.

BRIEF DESCRIPTION OF THE DRAWINGS

FIG. 4 is a side view of the invention, partially in cross-section, showing the invention just prior to striking the bottom.

FIG. 5 is a side view of the invention, partially in cross section, depicting the invention just after it has struck the bottom.

FIG. 6 is an isometric view of the glide vehicle resting on the bottom and deploying its hydrophone array.

FIG. 7 is a block diagram of the method of this invention.

DESCRIPTION OF THE PREFERRED EMBODIMENT

Figure 1A:
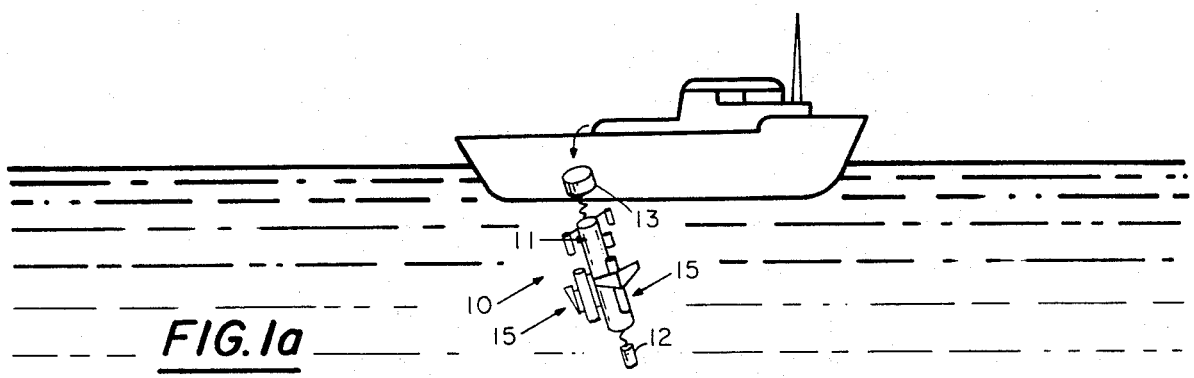
FIG. 1a portrays the initial stages of deployment of the master buoy.

Referring now to the drawings, FIG. 1a shows a master buoy 10 as it is being dropped over the side of a surface vessel and starting to separate. Because of the unique mechanical coaction which will be discussed, the master buoy can be clandestinely deployed over the side or through a well in a surface vessel or from a submarine. Irrespective which launch mode is chosen, the principles of operation are the same.

Three principal portions of the master buoy are a center body portion 11, a lower, or anchor portion 12, and a float portion 13. These three portions optionally are covered by a shell that comes off during deployment; however, for the sake of simplicity, the shell is deleted and an uncovered master buoy design is shown.

Figure 1B:
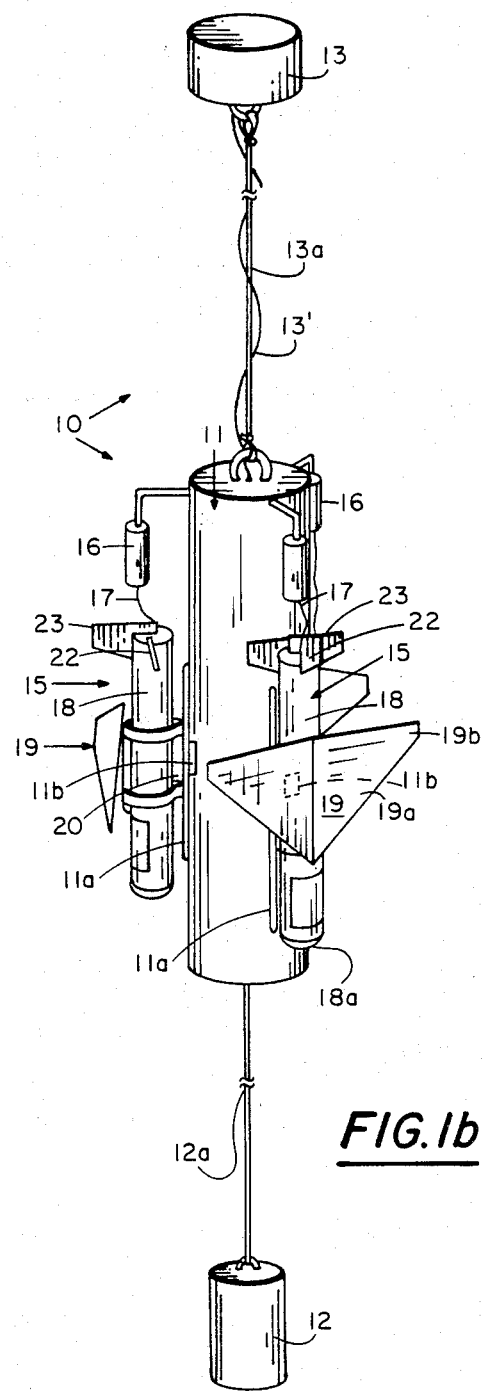
FIG. 1b shows the invention separating and on its way to the bottom.

After the master buoy has been deployed, anchor portion 12 and float portion 13 continue to separate, note FIG. 1b. This separation occurs after a predetermined time and is effected by mechanical, chemical, or other well known means. An anchor tether 12a is payed out from a spool, not shown, on the bottom side of the center body portion while a float line 13a extends from the top of the center body portion.

The anchor and float cooperate to vertically orient the center portion to assure the reliable deployment of a number of glide bodies 15. The length of the anchor tether particularly is critical since this governs the height of the glide bodies from the bottom and, hence, the limits of their spatial distribution.

The float line can also include an electrical conductor 13' which passes signals to the float. Optionally, a radio transmitter is carried in the float to transmit the signals to a distant receiver or the float can be eliminated when the conductor 13' runs along the bottom and extends to a remote shore post. Particularly, when the float is not used, center portion 11 is fabricated from a buoyant material or has buoyancy compartments to hold it above the bottom the proper distance to assure proper deployment of the glide bodies.

The glide bodies are circumferentially disposed about the central portion on a number of longitudinal tracks 11a with solenoid released 11b engaging the bottom of a weighted harness 20. Spools 16 carry sufficient lengths of sensor cables 17 which extend into an elongate body 18 of each glide vehicle. At their opposite ends the sensor cables are coupled to conductor 13'. Optionally, spools 16 are carried on the bodies to ease deployment.

Figure 2:
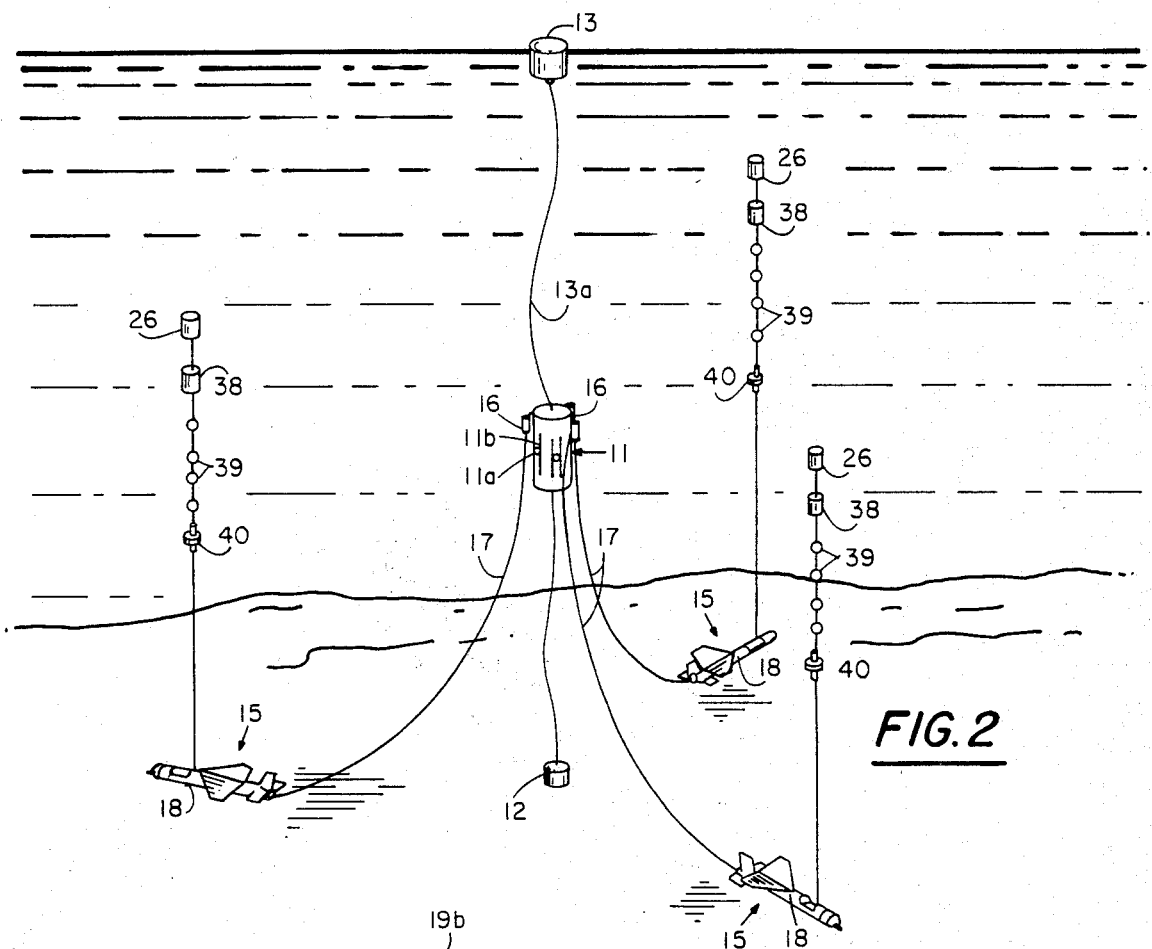
FIG. 2 is a graphic representation of the array deployed.

Because each glide vehicle is negatively buoyant, they fall when the solenoid releases are actuated. The hydrodynamic interaction of a wing 19, a horizontal stabilizer 22 and a vertical stabilizer 23 along with the shape of elongate body 18 cause the vehicles to swoop radially outwardly from the central portion, see FIG. 2. As mentioned above, the distance they glide radially outward is a function of the height central portion 11 is above the bottom.

The dimensions of the vehicle can vary according to a given task. Typically, the vehicle's weight in the water is designed to be no more than twenty pounds and the elongate body has a four-and-one-half inch diameter and a thirty inch length. This coupled with the shape, orientation and location of the wing and stabilizers produces a glide velocity of about seven feet per second at a maximum glide angle of 45°. This velocity and glide angle reduce cable drag of the sensor cable 17 and avoid the possibility of damage of internally carried components upon impact.

It was discovered that longitudinal stability was improved by having wing 19 delta shaped as compared to a wing having a constant cord. Longitudinal stability in swept back or delta shaped wings is a function of degree of sweep back and aspect ratio. Aspect ratio is defined as the span squared divided by the wing area. For packaging considerations of master buoy 10, it is clear that the wing span must be short. Thus, for any given weight (which directly affects lift required and, therefore, wing area) a low aspect ratio is desirable.

With these considerations in mind, wing 19 had a delta-shaped portion 19a and a trailing portion 19b. With the assumed parameter of weight, (20 pounds) glide angle, (maximum glide angle 45°) and glide velocity, (low glide velocity of approximately seven feet per second), an appropriately shaped wing can be designed by applying the following aerodynamic equations:

$$\tfrac{1}{2}\rho V^2 C_L S = L \tag{a}$$

$$\tfrac{1}{2}\rho V^2 C_D S = D \tag{b}$$

$$\tfrac{1}{2}\rho V^2 C_m S C = Mw \tag{c}$$

where
L = lift,
D = drag, and
Mw = wing pitching moment.
The constant $\rho$ is dynamic density. For water.

$$\rho = \frac{1.94 \text{ lb}_m\text{-sec}^2}{\text{ft}^4} \tag{d}$$

Additionally,
V = velocity,
S = wing area,
$C_L$ = lift coefficient,
$C_D$ = drag coefficient,
$C_m$ = pitching moment coefficient, and
C = wing chord.

Initially, if the body and tail contributions to lift and drag are neglected, the wing effects can be analyzed. For a wing in a steady state glide, the forces of lift and drag form a resultant force vector equal and opposite to the weight. In other words, neglecting the body and tail effects and assuming that lift is approximately equal to weight, the necessary wing area is determined from the given weight.

Aerodynamic theory shows that the minimum glide angle occurs when $$\frac{C_L^{3/2}}{C_D}$$

is a maximum. This happens when $C_L = 0.4$, $C_D = 0.06$ and the angle of attack, defined as the angle between the flight path and the root chord of the flat plate wing equals 6.5°.

In glide vehicle 15 wing 19 was chosen to have an aspect ratio of 2.8 and a sweep back angle of 45°. Thus, the dimensions of the wing can be calculated from equation A as being:

$$\text{Lift} = \text{Weight} = \tfrac{1}{2}\rho V^2 C_L S$$

If V = 7 FPS.

$$S = \frac{W}{1/2\, \rho V^2\, C_D} =$$

$$\frac{20 \text{ lb}}{(1/2)(1.94 \text{ lb-sec}^2/\text{ft}^4)(7 \text{ ft/sec})^2(0.4)} = 1.05 \text{ ft}^2.$$

Figure 3A:
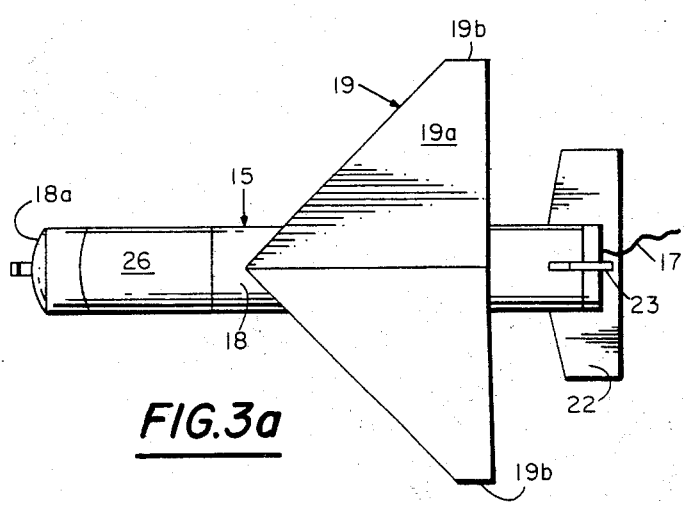
FIGS. 3a, 3b, and 3c are top, side, and rear views of the glide vehicle, respectively.
Figure 3B:
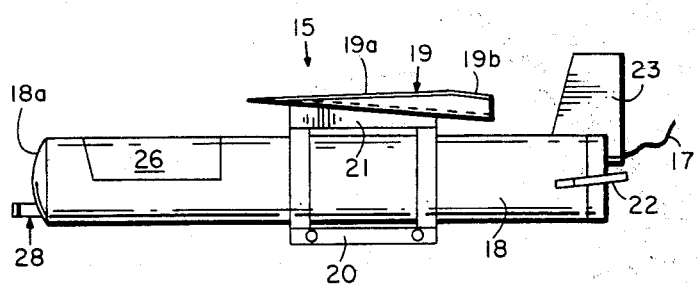
Figure 3C:
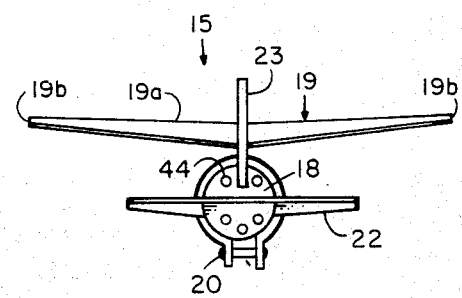

That is to say, referring to FIGS. 3a, 3b, and 3c, each side of the delta-shaped portion 19a of the wing is swept back 45° and its overall width is twenty-two inches, the front to rear length of the delta-shaped portion 19a and the trailing portion 19b equals thirteen inches with a two inch length for portion 19b.

With the wing dimensioned as stated above, S actually equaled 1.1 ft.². This implies a wing loading of 18.18 pounds per square foot.

The mean aerodynamic chord of this wing is located at a point 6.5 inches aft of the apex of the delta shaped portion 19a. The mean aerodynamic chord is defined as the point on a wing where the moment coefficient is constant for any angle of attack. At zero velocity, the vehicle should nose down and begin a gliding dive. The wing was placed on the elongate body to locate the mean aerodynamic chord nine tenths of an inch behind the glide vehicle's center of gravity.

The wide angle of incidence (the angle between the wing root chord and the body longitudinal axis) is set at six degrees to closely correspond to the most efficient angle of attack. Thus, pylon 21 has a six degree wedge shaped configuration to provide the proper wing angle of incidence and locates the wing above and behind the center of gravity of the glide vehicle to increase role stability. The enhanced role stability, which is important to obtain glide heading, additionally puts the main aerodynamic chord above the center of gravity to establish a positive righting moment.

Roll and heading stability were further improved by the wing's being shaped with a positive dihedral angle, noting FIG. 3c. The dihedral angle was set at 10°.

A horizontal stabilizer 22 was added to increase pitching stability and a vertical stabilizer 23 was incorporated into the design to increase yaw stability. Areas of the two stabilizers were arbitrarily set at ten and five percent of the wing area, respectively.

In the foregoing discussion, drag forces on the body and tail were neglected. However, in the actual case these forces are considerable and will result in a steeper glide angle than that calculated for the wing-only case. Some of these forces can be attributed to the pitching moment. Pitching moment about the mean aerodynamic chord (pitching moment is positive nose-up) caused by the wing at the design velocity of seven feet per second may be calculated from equation (c) above.

$$M_w = \tfrac{1}{2}\rho V^2 C_m S C$$

If $C_m$ equals 0.015 at a 6.5° angle of attack, $M_w = 0.86$ foot pounds. The static moment caused by the center of gravity—center of lift separation may be calculated for level flight by assuming that lift equals weight. Thus, the twenty pound lift separated by the nine-tenths of an inch separation between the center of gravity and the main aerodynamic chord is equal to a $-1.5$ foot pound value. Therefore, the horizontal stabilizer 22 must apply a positive pitching moment of 0.64 foot pounds (0.86 foot pounds $-1.5$ foot pounds $= -064$ foot pounds).

Following the same argument as for the wing and applying Equation a we have $$\text{Lift(L)(Horiz. stab)} = \tfrac{1}{2}\rho V^2 C_L S$$

and if the moment arm between the horizontal stabilizer and the center of gravity is fifteen inches the required lift is $$L = M/15 \text{ inches} = 0.5 \text{ lb.}$$

Since it was arbitrarily chosen that the area (S) of the horizontal stabilizer is ten percent of the wing area or roughly 0.1 square feet and $V = 7$ feet per second solving for $C_L$ in Equation (a) shows that $$C_L = \frac{L}{1/2\,\rho V^2 S}$$

For flat plate air foils of a shape similar to the horizontal stabilizer 22, a $C_L$ is attained at an angle attack of less than four degrees. Therefore, the leading edge of horizontal stabilizer 22 was angled downwardly with respect to its trailing edge at an angle of less than four degrees.

Thus, it is apparent that as the velocity of the glide vehicle approaches zero, wing and tail moments approach zero. However, since the moment attributed to the center of gravity is forward on the glide vehicle and independent of velocity, the vehicle will assume a nose down attitude and begin to gain velocity along the glide path. As the velocity increases, wing and tail moments increase, causing a nose-up moment until the forces are balanced and a stable glide path is obtained. The effect of moving the wing aft is to decrease the static moment which requires a higher velocity to balance the moments and results in a steeper glide path.

A further consideration is that the sensor cable 17 drag affects the vehicle in the same manner as increased hydrodynamic drag and results in a steeper glide angle. This, however, did not impose unacceptable performance when the glide vehicle swooped at distances ranging from fifty to two hundred feet from the master buoy.

One other consideration which must be taken into account is the stall velocity of the wing. If cable drag or other effects slow the vehicle below its stall velocity, flight becomes unstable. For the disclosed configuration the stall velocity was approximately equal to four feet per second.

Having finalized the design of the glide vehicle the payload and its deployment is the next concern. Elongate body 18 is provided with a cavity 25 which is normally closed by a primary float 26. The float is biased to be expelled from the cavity opening by an ejection spring 27 that is normally arrested by a latching assembly 28.

The latching assembly reaches through a nose portion 18a of the elongate body and includes a spring biased plunger 29 having a disc-shaped head 29a. An elongate section of pipe 30 slidably retains the plunger. The length of the plunger is such that it normally lies just short of a pin 31 which is held in shear between the inner end of pipe 30 and a short length of tubing 32 molded in primary float 26.

When the glide body impacts on the bottom, plunger head 29a is displaced and plunger 29 drives pin 31 from pipe 30 and into tubing 32. Spring 27 ejects the primary float from the mouth of the cavity, see FIG. 5.

With the primary float out of the way a semicylindrically shell-shaped tray 33 is driven forward toward the mouth of the elongate body 18 by a plunger 34 and biasing spring 35. A shaft 36 connected to the plunger-spring combination guides the combination's extension toward the mouth of the elongate body driving the tray as it does.

A lanyard 37 coupled to the ejected primary float pulls out a secondary float 38 and both are buoyed upward. A recess 38a in the secondary float contains a number of hydrophones 39 each coupled together by a conductor 41. The buoyed conductor, in turn, pulls a preamplifier 40 from the tray 33 and additional lengths of conductor 41 are unwound from a pair of spindles 42. Conductors 41 are coupled inside the glide bodies to the sensor cables 17. After all the conductor has been pulled from the spindles, the floats, hydrophones and preamplifiers assume the configuration shown in FIG. 2.

While what has been disclosed above is a novel apparatus for deploying hydrophone arrays, the inventive concept of this invention also embraces the method of deployment. This method is schematically depicted in FIG. 7.

First there is delivering 45 into the water of the master buoy and a subsequential releasing 46 of a float portion and the releasing 47 of an anchor portion. The float portion and the anchor portion effect a maintaining 48 of a central body portion at a predetermined distance from the bottom. Once this positioning has occurred, there next follows the disengaging 49 of a number of vehicles and the gliding 50 of the vehicles to positions radially disposed from the central body portion. After the vehicles strike the bottom, there is a feeding 51 of a number of hydrophones from each vehicle and the anchoring 52 of the hydrophones by the vehicle's remaining on the bottom. Lastly, there is a transmitting 53 of signals representative of impinging acoustic energy on the hydrophones to a remote monitoring station.

Although this disclosure concerns itself with the deployment of three glide vehicles, many more can be deployed from a master buoy. Stacking the glide vehicles on a longer central portion or making the central portion larger in diameter are ways more vehicles could be accommodated.

Obviously, many modifications and variations of the present invention are possible in the light of the above teachings, and, it is therefore understood that the invention may be practiced otherwise than as specifically described.

What is claimed is:

1. An apparatus for hydrodynamically deploying by gravity at least one hydrophone means comprising:
    means for defining an elongate body member having a cavity to contain the hydrophone means therein;
    a horizontal stabilizer mounted on the aft end of the defining means for creating a hydrodynamic positive pitching moment to increase pitching stability;
    a delta-shaped wing mounted on top of the defining means for providing hydrodynamic lift, the center of lift of which is aft of the center of gravity of the apparatus and the elongate body member defining means with the hydrophone means, the horizontal stabilizer, and the delta-shaped wing have sufficient mass to assure that gravity effects the hydrodynamic deployment thereof;
    means interposed between the defining means and the delta-shaped wing for raising the delta-shaped wing above the defining means to increase roll stability, the raising means is configured to orient the delta-shaped wing in an inclined positive angle with respect to the longitudinal axis of the defining means;
    a vertical stabilizer mounted on the top of the aft end of the defining means for ensuring yaw stability and the delta-shaped wing is shaped with a positive dihedral angle to further increase roll stability; and
    means mounted on the elongate body member for closing the cavity.

2. An apparatus according to claim 1 further including:
    means extending through the elongate body member for releasing the closing means from its covering position over the cavity when it is displaced upon striking an object.

3. An apparatus according to claim 2 in which the closing means is fashioned from a buoyant material and is connected to the hydrophone means.

4. An apparatus according to claim 3 further including:
    means disposed within the elongate body member for carrying the hydrophone means and
    means disposed within the elongate body member for urging the carrying means toward the opening of the cavity.

5. An apparatus according to claim 4 in which, upon the displacement of the releasing means, the closing means is buoyed upward, the urging means pushes the carrying means toward the opening and the closing means pulls the hydrophone means from the cavity.

6. An apparatus according to claim 5 in which the elongate body member has a sufficient mass to function as an anchor for the hydrophone means and the hydrophone means includes several hydrophones coupled to a preamplifier having a conductor extending to the elongate body member and on to remote monitoring circuitry.

* * * * *